P. CATUCCI.
HOB GRINDING MACHINE.
APPLICATION FILED FEB. 16, 1909.

986,688.

Patented Mar. 14, 1911.

4 SHEETS—SHEET 1.

WITNESSES:
A. H. Lockwood
O. A. Alliston

INVENTOR
Pliny Catucci
BY
Fischer & Sanders
ATTORNEYS.

P. CATUCCI.
HOB GRINDING MACHINE.
APPLICATION FILED FEB. 16, 1909.

986,688.

Patented Mar. 14, 1911.
4 SHEETS—SHEET 2.

WITNESSES:

INVENTOR
Pliny Catucci
BY
Fischer & Sanders
ATTORNEYS

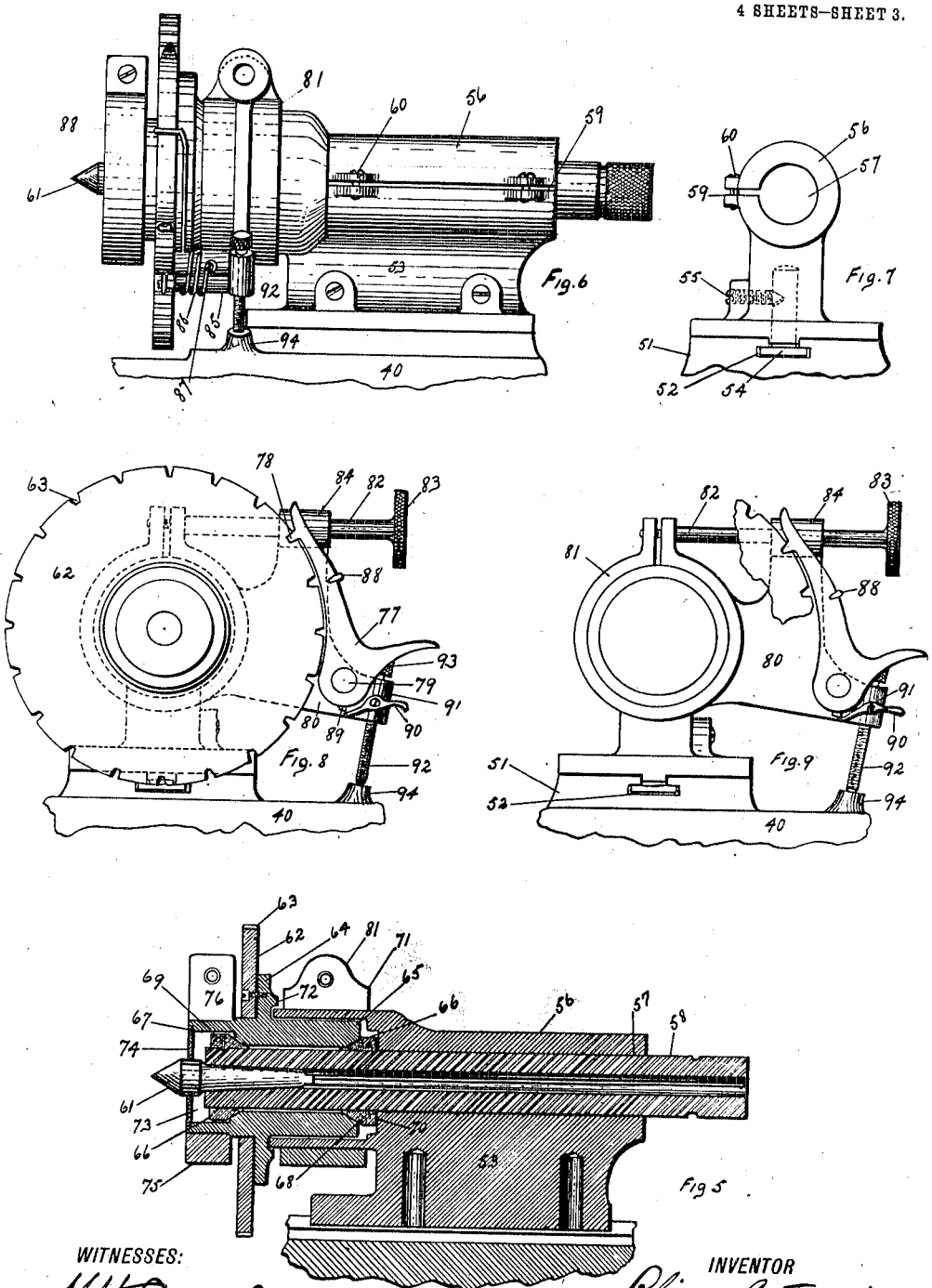

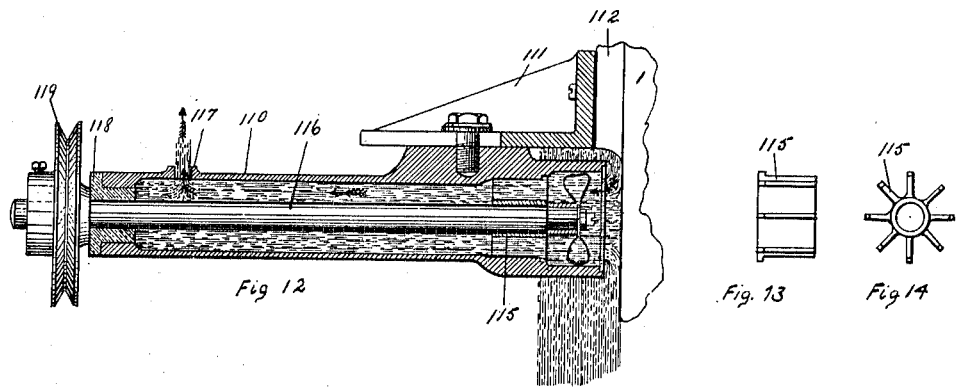
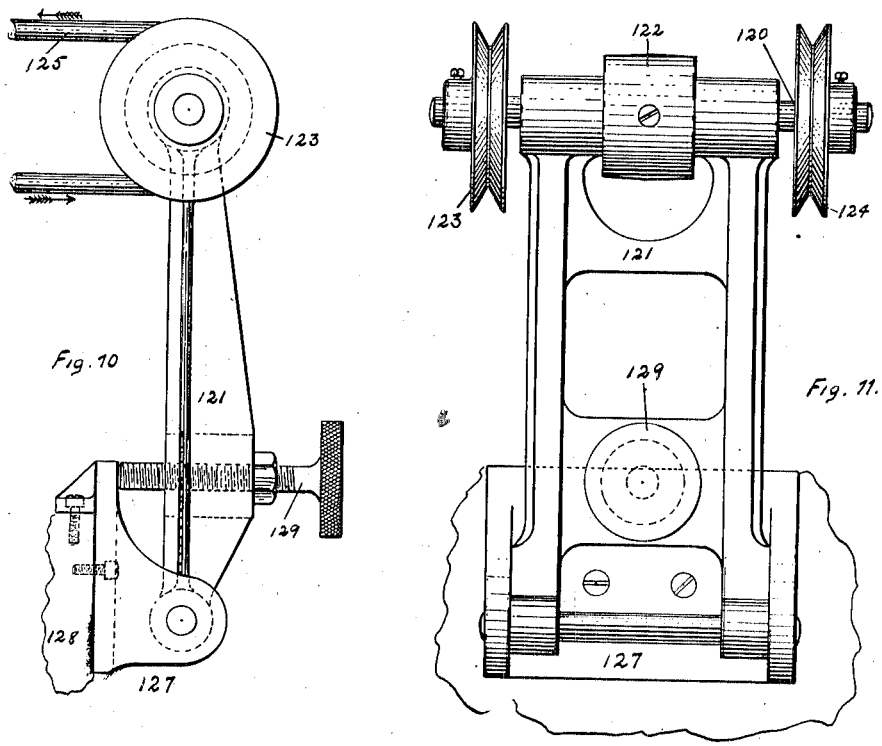

UNITED STATES PATENT OFFICE.

PLINY CATUCCI, OF NEWARK, NEW JERSEY, ASSIGNOR, BY MESNE ASSIGNMENTS, TO MEISSELBACH-CATUCCI MANUFACTURING COMPANY, A CORPORATION OF NEW JERSEY.

HOB-GRINDING MACHINE.

986,688.   Specification of Letters Patent.   Patented Mar. 14, 1911.

Application filed February 16, 1909. Serial No. 478,310.

*To all whom it may concern:*

Be it known that I, PLINY CATUCCI, a citizen of the United States, residing at Newark, in the county of Essex and State of New Jersey, have invented certain new and useful Improvements in Hob-Grinding Machines, of which the following is a full, clear, and exact description, such as will enable others skilled in the art to which it pertains to make and use the same.

My invention relates to cutter grinders in which a dished emery wheel is used to grind the working faces of the cutter teeth in a radial plane passing through the axis of the cutter. In the machines usually employed for this purpose, the shaft of the emery wheel is rotated in fixed bearings, while the hob or cutter being ground is positioned by resting a tooth of the cutter upon a guide secured to the bed of the machine, hence in using this type of machine, any inaccuracies in the cutter, due to warping in hardening or error in grinding, will be amplified by repeated grindings.

The object of my invention is to provide a grinding machine by the use of which, any defects in the cutter will be corrected and the cutting faces ground in radial planes passing through the axis of the cutter, thus insuring equal working efficiency for all the teeth thereof. The main features employed by me to obtain these results are, a disk fixed upon the frame of the machine to locate the radial plane, an adjustable bearing for the emery wheel so that it may be brought to the radial plane, and an index plate to properly space the work being ground. The details of these and other features of my invention will be more fully brought out in the following description.

Figure 1:
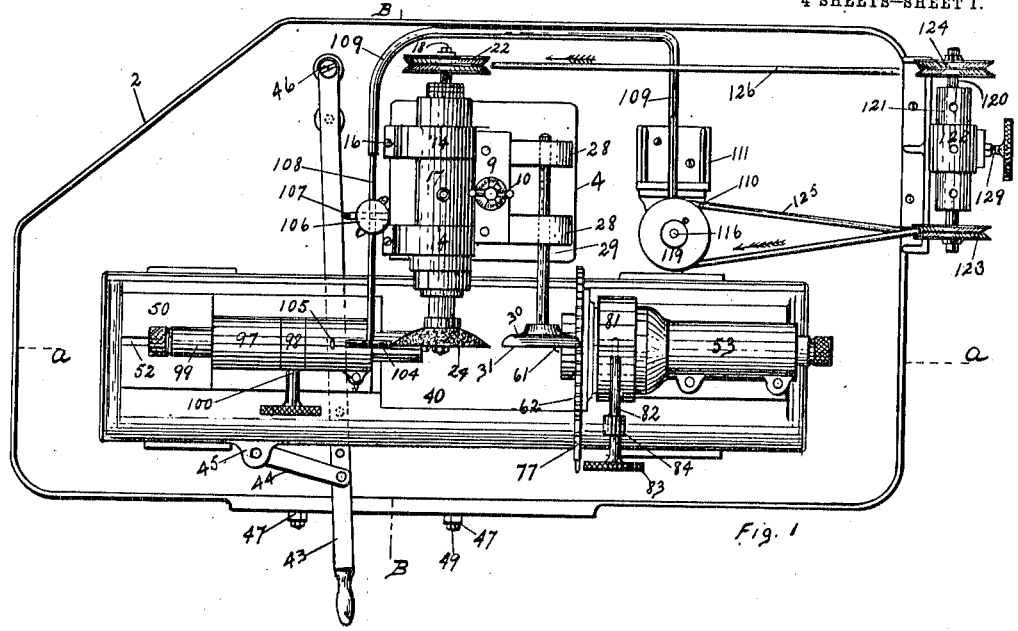
Figure 2:
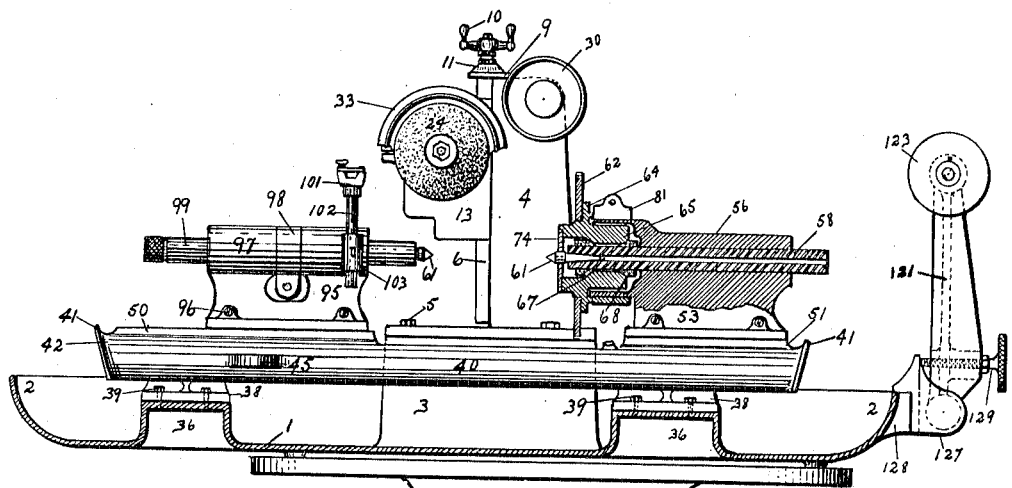
Figure 4:
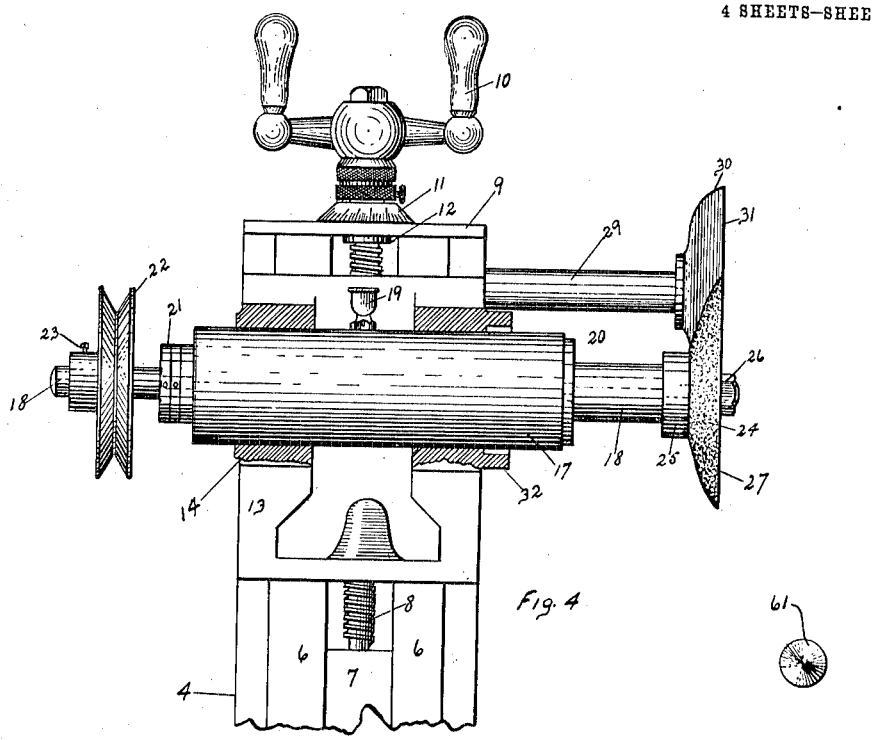
Figure 3:
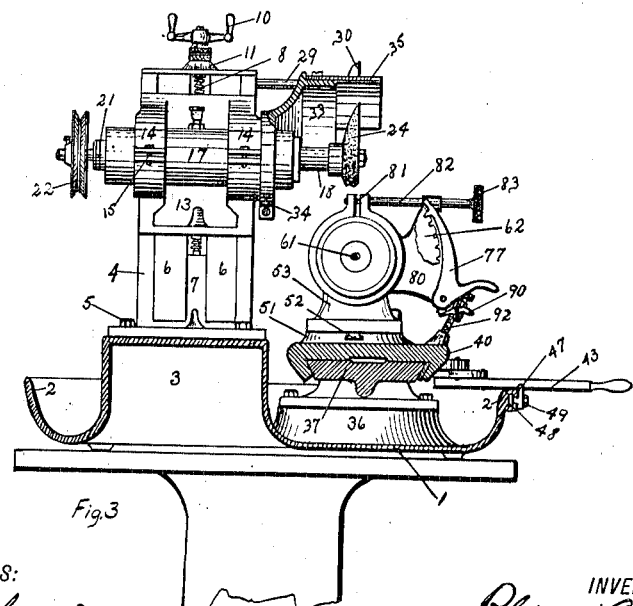

In the accompanying drawings forming a part of this specification, Figure 1 is a plan view of the machine. Fig. 2 is a front elevation, partially in section, along the line A—A of Fig. 1. Fig. 3 represents a transverse section taken along the line B—B of Fig. 1. Fig. 4 is an enlarged view of the emery wheel bearings and slide block. Fig. 5 shows a longitudinal section of the head stock. Figs. 6, 7, 8, and 9 are detail views of the head stock. Figs. 10 and 11 illustrate the counter shaft cradle. Fig. 12 is a vertical sectional view of the pump; and Figs. 13 and 14 illustrate a part of the pump.

Similar letters of reference refer to like parts throughout the specification and drawings.

In the drawings, 1 represents the bed of the machine which has a flange 2 around it, to form a basin or trough to contain a supply of water to be used in cooling the work piece being ground.

3 represents a pier, cast with and rising from the bed 1, to serve as a support for the standard 4 which is bolted thereto by lag bolts 5. On one side of the standard 4 are cast slide tracks 6, while between the slide tracks 6 and near the bottom of the standard 4, is cast a rib lug 7, which serves as a thrust bearing for the lower end of the slide-block screw 8, best shown in Figs. 3 and 4.

9 represents a cap plate on the standard 4 which serves as a bearing for the upper end of the screw 8.

10 represents the handle attached to the upper end of the screw 8, below which is placed the usual graduated collar 11 for finger adjustments, while 12 represents the upper thrust collar The screw 8 supports and permits adjustment of the slide block or carriage 13, which is arranged to slide on the vertically disposed slide track 6. The slide block 13 has outwardly extending bearing supporting brackets 14, shown in section in Fig. 4. These brackets 14 are really split clamping rings, split at 15 and drawn together by the screws 16. Passing through the ring brackets 14, and supported upon the slide block thereby, is the cylindrical bearing case 17, through which passes the emery wheel spindle 18. 19 represents an oil cup in the bearing case 17. A cone bearing 20 is turned upon the forward end of the spindle 18, and an adjustable one 21 mounted on the opposite end thereof, which provides a suitable means for taking up any lost motion of the emery wheel spindle 18, due to wear or other cause. The emery wheel is driven by the pulley 22 attached to the spindle 18 by a set screw 23.

The emery wheel 24 is clamped to the forward end of the spindle 18 against a backing collar 25, by means of the nut 26. The emery wheel 24 here shown, is what is called a dished emery wheel, and has a narrow ring-like working face 27. From the above described arrangement of cylindrical bearing case 17 and clamping bracket supports 14, it will be seen that the emery wheel may be adjusted to a new position by loosening the clamping screws 16, moving the bearing case 17 forward or backward and again clamping by means of screws 16. The object of this adjustment will appear later.

In ordinary grinders of this type, the emery wheel and centers are brought into the same plane by some makeshift method depending more or less upon the accuracy of the eye of the operator. I employ a special fixed attachment for this purpose which accurately locates the radial plane.

At the top of the standard 4 and to the right of the emery wheel, as seen in Fig. 1, are the lugs 28 having holes therethrough, in which the rod 29 is fixed so as to maintain the hardened steel disk 30, mounted on the end of the rod 29, with its working face 31 in the vertical plane passing through the work centers, and used as more fully explained later.

The right hand ring bracket 14 as seen in Figs. 3 and 4, has a forwardly extending flange 32, to which a guard flange 33 is attached by means of the split collar 34. A guard apron 35 is attached to the flange 33 and extends over the emery wheel 24 so as to confine the flying water and grit.

Near the front of the basinlike bed 1, 2 are two piers 36, best shown in Figs. 2 and 3, to which is fastened the slide track 37. At each end of the slide track 37 is a short depending leg 38, having flanges through which pass the lag bolts 39 which secure the track firmly to the bed piers 36. Mounted to slide upon the track 37 is the slide bed 40, having the usual means for oiling and adjusting for wear, which is made much longer than the slide track 37, so that in ordinary use the track shall not be exposed to flying water and grit. As a further precaution, upstanding flanges 41 are provided at the ends of the slide bed 40, together with grooves 42 to conduct the used water to the basin below. The track 37 is carefully positioned so that a point on the slide bed 40 shall reciprocate in a plane at right-angles to the axis of the emery wheel 24. This feature is important, because it permits the grinding of the cutter teeth parallel to the axis of the cutter, or the teeth of a gear wheel parallel to its axis.

The slide bed 40 may be reciprocated upon the track 37 by means of the adjustable hand lever 43 connected by the link 44 to the lug 45 on the slide bed, the lever 43 being adjustably pivoted to a boss on the bed 1 at 46.

To limit the motion of the slide bed 40, two stops 47 are mounted on the front edge of the basin rim 2, the stops being adjustable by the usual T-slot 48 and bolts 49. On the top face of the slide bed 40 are two slightly elevated planed surfaces 50 and 51, with T-slots 52 milled therein, which slots are in line with each other and parallel to the line of motion of the reciprocating slide bed. On the planed surface 51 at the right end of the slide bed 40, is mounted the head stock 53, clamped to the slide bed by the bolts 54 in the T-slot 52, the clamping being done by the cone-pointed screws 55 as best shown in Fig. 7.

The cylindrical portion 56 of the head stock 53 is bored out at 57 to receive the hollow center spindle 58, and cut through at 59 so the spindle 58 may be clamped in the usual way by means of the screws 60. The left end of the hollow spindle 58 is taper-bored at one end to receive the tapered center 61. The hollow spindle 58 being clamped, it will be seen that the center 61 will be what is called a dead center, and work rotated thereon will not be liable to eccentricity.

In ordinary cutter grinding machines, the cutter is usually placed upon an arbor revoluble upon centers, and turned by hand, the cutter being positioned for grinding by resting a tooth of the cutter upon a guide fixed upon the frame of the machine. Thus, if a tooth has become warped in hardening or has been ground imperfectly, this error will be retained and increased from time to time by repeated grindings. In order to overcome this objection, I mount upon the head stock center shaft 58, an index plate or wheel 62 accurately divided by the notches 63 into uniform spaces to conform to the number of teeth on the cutter, or some multiple thereof, (best shown in Figs. 5, 6, 7, 8 and 9). The index plate 62 is fastened to a flange 64 upon a tubular hub 65, which has internal cone bearing surfaces 66 at each end thereof. The hub 65 rotates upon cone bearing rings 67 and 68 upon the spindle 58.

The bearing cone ring 67 is fastened to the spindle 58 in any suitable manner, as by pin or set screw 69, while the bearing cone 68 remains as a loose collar and brings up against a shoulder 70 in the bored out head stock. This arrangement secures a wide bearing for the index wheel 62, and any lost motion may be readily taken up by loosening the screws 60 and drawing the spindle 58 toward the left, thus bringing the cone bearing rings 67 and 68 closer together, inasmuch as the ring 68 is movable on the spindle, after which the spindle is clamped by means of the screws 60. The cylindrical part of the head stock is enlarged at 71 and bored out to inclose the hub 65, and the cone bearing collar 68. On the back of the flange 64 is a rearwardly extending circular flange 72, which extends over the end of the bearing case 71 and protects the joint, and hence, the bearings from water and grit.

The left end of the hub 65 has an extending flange 73 which is counterbored to receive the cone bearing ring 67. The flange 73 at the end thereof is again counterbored to receive a washer 74 of fiber or leather, which fits snugly about the center 61 and protects the bearing from water and grit. About the hub flange 73 and in front of the index wheel 62 is clamped a split ring 75 having the radially extending clamping lugs 76, long enough to serve as a dog face-plate for the arbor.

The index wheel is positioned, and held from rotation by the toothed pawl 77, 78 being the tooth. In order that the index wheel, and the cutter dogged thereto, may be properly positioned with respect to the radial plane of the cutter, it is necessary that some adjustment should be provided. This is secured by pivoting the pawl 77 at 79, upon an arm 80, capable of rotation about the axis of the index wheel 62. The enlarged cylindrical portion 71 of the head stock 53 is turned down to receive the split collar 81 which is cast with and forms a part of the pawl supporting arm 80, and may be clamped in any position by the screw 82, the outer end of which is provided with a knurled head 83. The screw 82 is steadied by passing it through a hole bored in the lug 84 cast upon the arm 80. The arm 80 also has cast upon the side thereof, a boss 85, (shown in Fig. 6) which carries the pawl pivot 79. About the boss 85 is coiled a spring 86, one end of which is fastened to the boss at 87, while the other end is bent over the back of the pawl at 88, so as to urge it toward the index wheel 62.

It is sometimes desirable to have the index wheel run free, hence, I provide the pawl 77 with a stop lug 89 and pivot a gravity pawl 90 on the arm 80, which may be thrown into engagement with the stop lug 89 to hold the pawl tooth 78 out of engagement. The arm 80 also has another lug 91, through which is threaded the adjusting screw 92, having a knurled head 93, the lower end of which thrusts against a boss 94 upon the slide bed 40. Now it will be seen that the position of the index wheel 62 may be shifted when the collar 81 is loosened by turning the screw 82. The arm 80 and its related parts may then be adjusted by turning the screw 92, after which it is clamped by the screw 82.

The tail stock 95 is adjustably mounted upon the left end of the slide bed 40 and may be clamped thereto by the screws 96 in a manner similar to that employed upon the head stock 53, and shown in Fig. 7. I have improved the means for clamping the tail stock center spindle by cutting away the central portion of the tubular spindle-way 97 and inserting a split clamping ring 98, whereby the tail spindle 99 is clamped by turning up the knurled headed screw 100, thus enabling an operator to quickly insert or remove an arbor.

To have the cutters properly ground, it is necessary to true up the emery wheel frequently. To do this accurately and quickly, I mount upon the tail stock 95 an adjustable clamp 101 for holding the diamond. The clamp post 102 passes through a hole bored in the projecting lug 103 upon the tail stock. This arrangement insures the dressing of the wheel face parallel to the direction of motion of the slide bed, which is important.

To prevent overheating of the workpiece being ground, it is usual to flood the wheel or concentrate a stream of water at the grinding point. I employ the latter method, and provide a nozzle 104 having a regulating valve manipulated by the knob 105. The nozzle is mounted in a universal clamp nut 106 supported on the pin 107 carried by the emery wheel slide block 13. The tubular shank 108 of the nozzle 104 passes through the clamp nut 106, whereby the nozzle 104 may be adjusted to throw the stream of water upon the work at the point desired. The nozzle shank 108 is connected by the rubber tube 109 to the pump 110, which is located back of the head stock as seen in Fig. 1. The pump 110 is of a simple rotary style, vertically mounted to take water from the basin-like bed 1 of the machine, and force it to the nozzle 104. (See Fig. 12.) The pump 110 is bolted to a bracket 111 which is fastened to a boss 112 on the machine bed 1. The pump is mounted so that the lower end is slightly above the floor of the basin to permit the water to enter. The lower end is bored out at 113 to receive the propeller-like wheel 114 which lifts the water through the spider 115, (shown in Figs. 13 and 14) up the tubular barrel about the shaft 116 and forces it out of the port 117 and the nozzle 104. The upper end of the shaft 116 passes through the bushing 118 and carries the driven pulley 119. The spider 115 provides a bearing for the lower end of the shaft 116, and permits the flow of water to the port above.

The power to drive the emery wheel and the pump is received through the countershaft 120, carried upon the cradle 121, the belt-driven pulley 122 being mounted upon the shaft 120 between the pulleys 123 and 124. A belt 125 from pulley 123 to pulley 119 drives the pump; and a belt 126 from the pulley 124 to pulley 22 drives the emery wheel.

The countershaft cradle is mounted to swing upon a bracket 127 which is attached to a thickened portion 128 of the bed flange 2, as shown in Figs. 1, 2, 10 and 11. The screw 129, by thrusting against the bracket 127, is used to regulate the tension of the belts 125 and 126.

The general operation of the machine has been pointed out in the preceding description, but I shall here give more precise instructions.

The first operation should be the truing up of the emery wheel 24, which is done by placing a diamond in the bracket clamp 101 and moving it across the face of the emery wheel 24 by moving the bed 40 with the handle 43, thus making sure that the face of the emery wheel is parallel with the direction of motion of the slide-bed 40. The diamond may now be removed and the emery wheel 24 adjusted by releasing the spindle bearing case 17 and tapping the spindle until the face 27 of the wheel comes up against a straight edge placed across the disk 30, after which the bearing case 17 is clamped by the screws 16. This positions the face of the emery wheel 24 in the radial plane passing through the centers 61, as determined by the disk 30. The work to be ground is placed between the centers 61 by loosening the tail stock spindle 99 and, after having inserted the work, clamping it again by means of the split ring 98 and screw 100. The cutter is caused to rotate with the index plate 62 by a dog between the arbor and the collar lugs 76 on the hub of the index plate, thus the spacing of the teeth of the cutter will be done by an accurately graduated index plate and not by the teeth of the cutter. If the cutter teeth are not quite properly located with respect to the emery wheel 24, the collar 81 may be loosened by turning the screw 82, after which the cutter and index plate 62 may be adjusted by the screw 92, and again clamped by the screw 82. When the above preparations have been completed, the cutter is ground by reciprocating the slide bed 40 and spacing the cutter by means of the notches on the index wheel 62. Water to cool the work is supplied at the nozzle 104 by the pump 110.

I have shown my improvements embodied in a hob grinding machine, but I do not wish to limit my claims to this style of machine, as many of the improvements may be used in connection with other types of grinding machines.

I claim:

1. In a machine, the combination of centering means, a wheel and means for adjusting the plane of said wheel to coincide with and include the axis of said centering means.

2. In a machine, the combination of centering means, a disk whose plane is coincident with the axis of said centering means, a grinding wheel and means for adjusting the plane of said grinding wheel to lie coincident with the plane of said disk.

3. In a machine, the combination of a reciprocating bed, centering means carried thereby, a wheel and means for adjusting the plane of said wheel to coincide with the axis of said centering means.

4. In a grinding machine, the combination of work centering means, a grinding wheel and means for locating the plane of said grinding wheel to coincide with and include the axis of said centering means.

5. In a machine, the combination of a bed, work centering means carried thereby, a grinding wheel and a disk whose plane includes and coincides with the axis of said centering means and means for locating the plane of the grinding wheel in the plane of said disk.

6. In a machine, the combination of a reciprocating bed, work centering means carried by said bed, a wheel, means for adjusting said wheel longitudinally of the axis of its rotation, so that the plane of said wheel shall be coincident with and include the axis of said centering means and means for determining the position of said plane.

7. In a grinding machine, the combination of a reciprocating bed, work centering means carried thereby, a grinding wheel, means for adjusting the plane of said grinding wheel to be coincident with and include the axis of said centering means, and a disk for definitely locating said plane with respect to the axis of said centering means.

8. In a machine, the combination of centering means, a wheel, means for adjusting said wheel to coincide with a definite fixed plane passing through the axis of said centering means and means for locating said plane.

9. In a grinding machine, the combination of a reciprocating bed, centering means carried thereby, a grinding wheel, means for adjusting the plane of the grinding wheel to coincide with a fixed plane passing through the axis of said centering means and means for locating said plane.

10. In a grinding machine, the combination of a reciprocating bed, centering means carried thereby, a grinding wheel, means for adjusting the plane of the grinding wheel to coincide with a fixed plane passing through the axis of said centering means and fixed means upon the frame of the machine for locating said plane.

11. In a grinding machine, the combination of a reciprocating bed, centering means carried thereby, a grinding wheel and means for adjusting the plane of said wheel, to include the axis of said centering means.

12. In a grinding machine, the combination of a reciprocating bed, centering means carried thereby, a fixed disk the plane of which includes the axis of said centering means, a grinding wheel and means for adjusting the plane of said wheel coincident with the plane of said disk.

13. In a machine, the combination of a bed, work centering means carried thereby, means for reciprocating said bed, a disk whose plane is coincident with and includes the axis of said centering means, a grinding wheel and means for adjusting the plane of said grinding wheel to lie coincident with the plane of said disk.

14. In a grinding machine, the combination of a slide bed, means for reciprocating said bed, centering means carried by said bed, the axis of said centering means lying parallel with the line of reciprocation of said bed, a grinding machine and means for adjusting the plane of said grinding wheel to coincide with the vertical plane passing through the axis of said centering means and a fixed locating disk for locating said plane.

15. In a grinding machine, the combination of a slide-bed, centering means carried thereby, means for reciprocating said bed, a grinding wheel, means for adjusting the plane of the grinding wheel to coincide with a definite plane passing through said centering means and means for locating said plane.

16. In a grinding machine, the combination of a slide-bed, centering means carried thereby, means for reciprocating said bed, a grinding wheel, means for adjusting the face of the grinding wheel to coincide with a fixed plane passing through said centering means and a fixed disk upon the frame of the machine for locating said plane.

17. In a grinding machine, the combination of a reciprocating bed, centering means carried thereby, indexing means carried upon said centering means, a grinding wheel, means for locating the grinding wheel in the plane of said centering means and means for adjusting the indexing means with relation to said plane.

18. In a grinding machine, the combination of a reciprocating slide-bed, centering means carried thereby, indexing means carried upon said centering means, a grinding wheel, means for adjusting the grinding wheel to coincide with a plane passing through said centering means, a fixed disk for positively locating said plane and means for adjusting said indexing means with relation to said plane.

19. In a grinding machine, the combination of a reciprocating bed, a head stock carried thereby, a non-revolving center spindle mounted in said headstock, an index plate revolubly mounted upon said spindle and means carried by the headstock for positioning said index plate.

20. In a grinding machine, the combination of a slide-bed, centering means carried thereby, means for reciprocating said bed, indexing means carried upon said centering means, a grinding wheel, means for adjusting the grinding wheel to coincide with a plane passing through said centering means, a disk for locating said plane and means for adjusting said indexing means with relation to said plane.

21. In a grinding machine, the combination of centering means, a fixed plane disk for locating a radial plane through said centering means, an index plate upon said centering means and means for adjusting the index plate with relation to said plane.

22. In a grinding machine, the combination of a headstock carrying a non-revoluble dead center, an index plate revoluble about said center and means carried by the headstock for positioning and adjusting said index plate.

23. In a grinding machine, the combination of a headstock carrying a dead center, an index plate revoluble about said center, a pawl for positioning and holding said index plate and means for adjusting the position of said pawl.

24. In a grinding machine, the combination of dead centers to support a work piece, a disk whose plane passes through the axis of said centers, a grinding wheel means for locating the plane of said wheel in the plane of said disk, and means for cooling said grinding wheel and the workpiece.

25. In a grinding machine, the combination of a headstock carrying a dead center, an index plate revoluble about said center, a pawl for positioning and holding said index plate and means for holding said pawl in an inoperative position.

This specification signed and witnessed this 29th day of June, 1909.

PLINY CATUCCI.

Witnesses:
M. H. LOCKWOOD,
C. A. ALLISTON.